UNITED STATES PATENT OFFICE.

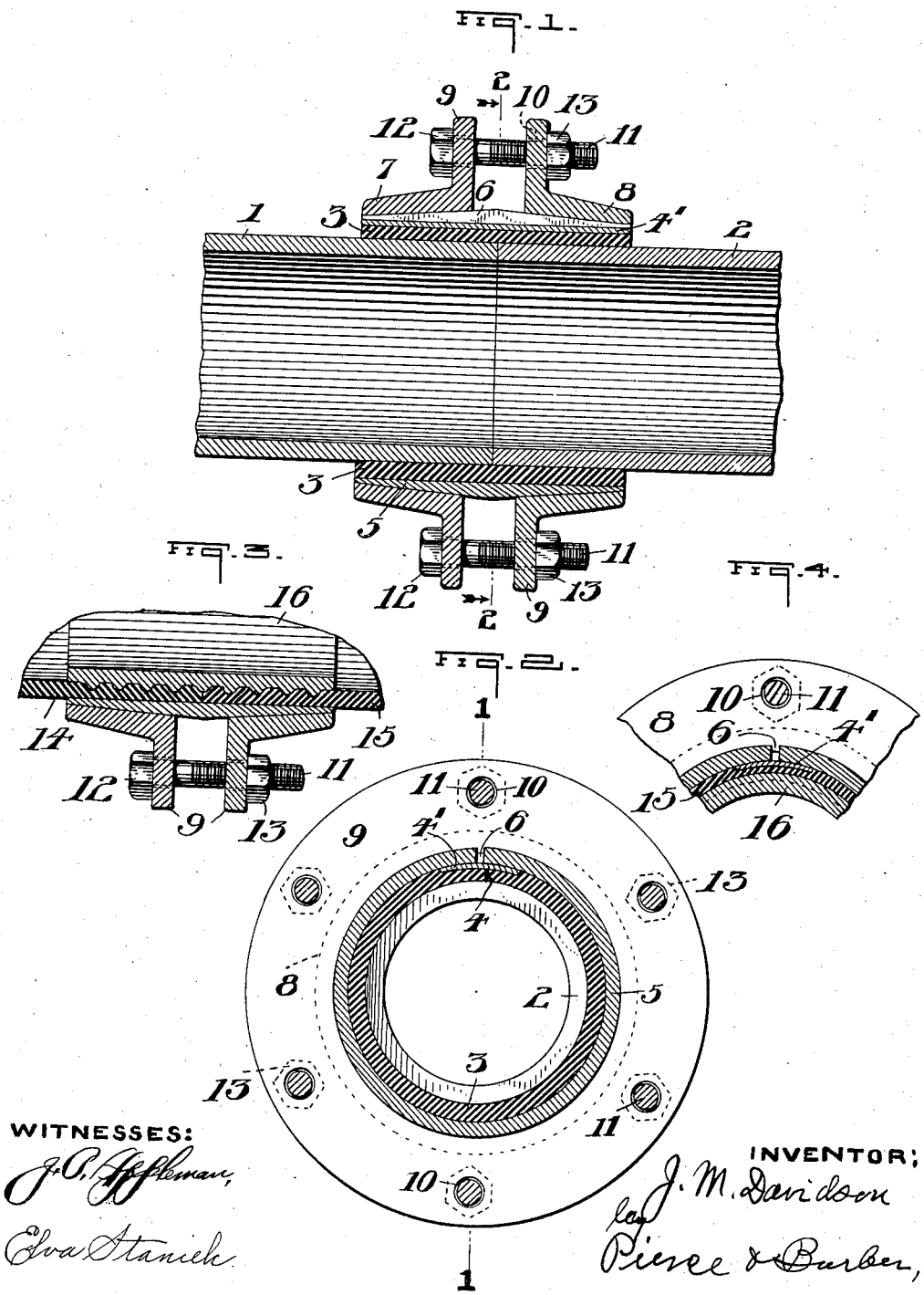

JOHN M. DAVIDSON, OF PITTSBURG, PENNSYLVANIA.

COUPLING FOR HOSE AND PIPE.

No. 859,546.                Specification of Letters Patent.         Patented July 9, 1907.

Application filed December 28, 1904. Serial No. 238,650.

*To all whom it may concern:*

Be it known that I, JOHN M. DAVIDSON, a citizen of the United States, residing at Pittsburg, in the county of Allegheny and State of Pennsylvania, have invented or discovered new and useful Improvements in Couplings for Hose and Pipe, of which the following is a specification.

My invention relates to couplings for hose or pipe and the object thereof is to produce a coupling that will form a perfectly tight joint.

Referring to the drawing which forms a part of this specification, Figure 1 is a longitudinal section on the line 1—1 of Fig. 2 showing one form of my coupling in use on a pipe joint; Fig. 2 is a transverse section on the line 2—2 of Fig. 1; Fig. 3, a longitudinal section of a portion of my invention applied to a hose; and Fig. 4, a central cross-section of the same.

In Figs. 1 and 2 of the drawings, 1 and 2 represent two pipes coupled together with one form of my invention. They preferably have their adjacent ends abutting and covered for some distance at each side of their ends with a piece of tubular packing 3, preferably divided longitudinally, as shown at the slit 4. This packing may be of rubber, or any other material suitable for the purpose. Longitudinally over the slit 4 I place a thin plate or strip 4', preferably of brass, but other material may be selected.

Sleeved on the packing 3 and plate 4 is the metal collar 5, also preferably of brass. This collar is also divided longitudinally by the slit 6, which preferably lies on the strip 4. The outer surface of the collar 5 is thickest around its central portion and tapers therefrom toward each end. Slidable toward each other on the said collar are the wedging sleeves or collars 7 and 8 having the flanges 9 standing transversely of the length of the tubes. The interior of the collars 7 and 8 are tapered to fit the tapers on the collar 5. The flanges 9 have the holes 10 to receive the bolts 11 each having the head 12 bearing on the outer face of one collar and its nut 13 on the outer face of the other collar, whereby the two collars 7 and 8 may be drawn toward each other, causing the collar 5 to be contracted in diameter, squeezing the packing closely in contact with the pipes, and the plate 4 into the packing as shown in Fig. 2. The compression of the packing by the strip 4' will cause it to form a tight joint along the slit 4 and prevent the escape of fluid therethrough. The plate or strip 4' forms a surface on which the edges of the slit 6 slide and permits them to approach closely or even touch, as would not be the case when the said edges bear on the packing. Preferably the slits 4 and 6 will be on opposite sides of the strip 4'.

When my invention is applied to hose I prefer the arrangement shown in Figs. 3 and 4, in which 14 and 15 are the abutting hose and 16 is a corrugated tube within the ends of the hose. Outside of the hose and over the ends thereof I employ the split collar 5 as in Figs. 1 and 2. Between the hose and the slit 6 in the collar I place the brass strip 4' which forms a friction surface for the edges of the slit to ride on and prevents the material of the hose from being pinched in the slit and limits the contraction of the collar by the wedging collars 7 and 8, which are drawn toward each other as in Figs. 1 and 2.

It will be seen that I have produced a powerful coupling which securely holds the sections of pipe or hose together and forms a safe and neat joint. It is easily operated and can be adjusted, when necessary, with no other tool than a wrench or its equivalent.

It is clear that my invention would seal a hole or protect a weak spot in a hose or pipe.

Having described my invention, I claim—

1. In a hose or pipe coupling, a sheet of compressible packing surrounding the hose or pipe, a protective strip on the packing over the adjacent edges of the packing, a slit collar sleeved on the packing and the strip and having the slit on the strip, and means for causing the collar to press the strip against the packing and the packing against the hose or pipe.

2. In a hose or pipe coupling, a sheet of compressible packing surrounding the hose or pipe, a protective strip on the packing over the adjacent edges of the packing, a slit collar sleeved on the packing and the strip and having the slit on the strip and its exterior wedge-shaped and wedging means for causing the collar to press the strip against the packing and the packing against the hose or pipe.

Signed at Pittsburg, Pa., this 22nd day of December, 1904.

JOHN M. DAVIDSON.

Witnesses:
F. N. BURBER,
A. M. STEEN.